United States Patent
Vedsted et al.

(10) Patent No.: US 7,179,163 B1
(45) Date of Patent: Feb. 20, 2007

(54) FISH CLEANING APPARATUS AND METHODS

(75) Inventors: Søren Christian Vedsted, Vadum (DK); Lars Erik Vedsted, Vadum (DK)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 11/422,667

(22) Filed: Jun. 7, 2006

(51) Int. Cl.
*A22C 25/14* (2006.01)

(52) U.S. Cl. ...................................... 452/121

(58) Field of Classification Search ........ 452/106–109, 452/120, 121, 123
See application file for complete search history.

(56) References Cited

U.S. PATENT DOCUMENTS

| | | | |
|---|---|---|---|
| 3,510,910 A | | 5/1970 | Erkins |
| 3,700,386 A | * | 10/1972 | Mencacci .................. 426/397 |
| 4,091,506 A | * | 5/1978 | Soerensen et al. .......... 452/116 |
| 4,291,436 A | | 9/1981 | Wulff |
| 4,300,263 A | * | 11/1981 | Gotz ........................... 452/67 |
| 4,570,286 A | * | 2/1986 | Ross ......................... 15/327.5 |
| 4,606,094 A | * | 8/1986 | Evich ......................... 452/125 |
| 5,026,318 A | * | 6/1991 | Jahnke ....................... 452/116 |
| 5,830,052 A | * | 11/1998 | Wadsworth ................. 452/161 |
| 5,980,376 A | * | 11/1999 | Grosseholz et al. ........ 452/116 |

FOREIGN PATENT DOCUMENTS

| | | |
|---|---|---|
| DE | 3327968 A1 | 2/1985 |
| EP | 0258941 A2 | 3/1988 |
| NO | 20040142 | 1/2004 |
| WO | WO 2005/067724 A1 | 7/2005 |
| WO | WO 2006/039932 A2 | 4/2006 |

* cited by examiner

*Primary Examiner*—Thomas Price
(74) *Attorney, Agent, or Firm*—James T. Cronvich

(57) ABSTRACT

Apparatus and associated methods for cleaning residual visceral matter from the belly cavity of a gutted fish. The cleaning apparatus includes a scraper attached at the mouth of a suction tube by a hinge. An actuator pivots the scraper about the hinge between an extended position biased into contact with the interior wall of the belly cavity and a retracted position out of contact with the wall. In the retracted position, the scraper covers the mouth of the suction tube to prevent dislodged visceral matter from falling back into the belly cavity. In the extended position, the scraper uncovers the mouth of the suction tube to allow scraped visceral matter to be sucked from the belly cavity.

14 Claims, 4 Drawing Sheets

FISH CLEANING APPARATUS AND METHODS

BACKGROUND

The invention relates generally to the butchering of fish and, more particularly, to automated methods and apparatus for scraping and evacuating residual matter from the belly cavities of fish.

After a fish, such as a salmon, has been gutted, especially in an automated process, residual visceral matter may remain in the belly cavity. Hard-to-remove matter, such as the vaccination wound in farm-raised fish, such as salmon, and the intestines and other residue in the vicinity of the vent, is often left in the belly cavity after gutting. A follow-up cleaning step is sometimes necessary to remove all this residual visceral matter from the belly cavity to improve the palatability and sanitation of the fish. In the follow-up cleaning step, the hard-to-remove matter is typically dislodged from the belly wall by scrubbers, such as scrapers or brushes, advancing along the length of the belly cavity. The dislodged matter is then removed by, for example, a suction tube advancing along with the scrubber. When fish are processed belly up, the suction tube extends into the belly cavity from above. When a scrubbing pass through the belly cavity is completed and the scrubber and the suction tube are retracted, visceral matter can be shaken from the suction tube by the rapid acceleration of the suction tube as it and the scrubber are being repositioned to process another fish. Visceral matter that falls back into the belly cavity compromises the quality of the processed fish.

Consequently, there is a need for thoroughly cleaning the belly cavities of fish to improve the overall quality of processed fish.

SUMMARY

This need and other needs are satisfied by an apparatus embodying features of the invention for cleaning the belly cavity of a gutted fish. In one aspect of the invention, the apparatus comprises a suction tube that has a mouth at a distal end. The mouth of the suction tube is inserted into the belly cavity of a fish through a slit extending along the length of the belly cavity. A scraper at the distal end of the suction tube can be moved from a closed position covering the mouth of the suction tube to an open position uncovering the mouth of the suction tube. In the open position, the scraper extends into contact with the fish inside the belly cavity.

In another aspect of the invention, an apparatus for cleaning the belly cavity of a gutted fish comprises a vacuum-activated suction tube having a mouth at a distal end that can be inserted into the belly cavity of a fish through a slit extending along the length of the belly cavity. A scraper having a scraping edge and an opposite edge is hingedly attached to the distal end of the suction tube. An actuator operatively coupled to the scraper pivots the scraper between a first position, in which the scraper covers the mouth of the suction tube, and a second position, in which the scraper uncovers the mouth of the tube. In the second position, the scraping edge of the scraper is angled away from the mouth of the suction tube.

In yet another aspect of the invention, an apparatus for cleaning the wall of the belly cavity of a gutted fish comprises a scraper with a scraping edge and a suctions tube. The scraper can be operated in an extended position, in which it moves along the length of the belly cavity of a gutted fish. The extended scraping edge scrapes the wall of the belly cavity to dislodge residual visceral matter. The suction tube, which moves with the scraper, has a mouth at its distal end near the scraper. The tube evacuates the dislodged residual visceral matter from the belly cavity as the extended scraper scrapes the wall along the length of the belly cavity. The scraper is also operated in a retracted position, in which it covers the mouth of the suction tube—the scraping edge out of contact with the wall of the belly cavity.

Still another aspect of the invention provides a method for cleaning the wall of the belly cavity of a gutted fish. The method comprises: (a) extending a scraper that is advancing along the length of the belly cavity of a fish out to a first position contacting the wall of the cavity to scrape visceral matter from the wall as the scraper advances along the belly cavity; (b) advancing a suction tube having an open mouth just ahead of the scraper as it advances along the length of the belly cavity to evacuate the scraped visceral matter from the cavity; and (c) retracting the scraper into a second position out of contact with the wall of the belly cavity and covering the mouth of the suction tube to prevent visceral matter from leaking from the suction tube into the cavity while the scraper and the suction tube are being repositioned to resume scraping.

BRIEF DESCRIPTION OF THE DRAWINGS

These aspects and features of the invention, as well as its advantages, are better understood by reference to the following description, appended claims, and accompanying drawings, in which:

DETAILED DESCRIPTION

Figure 1B:
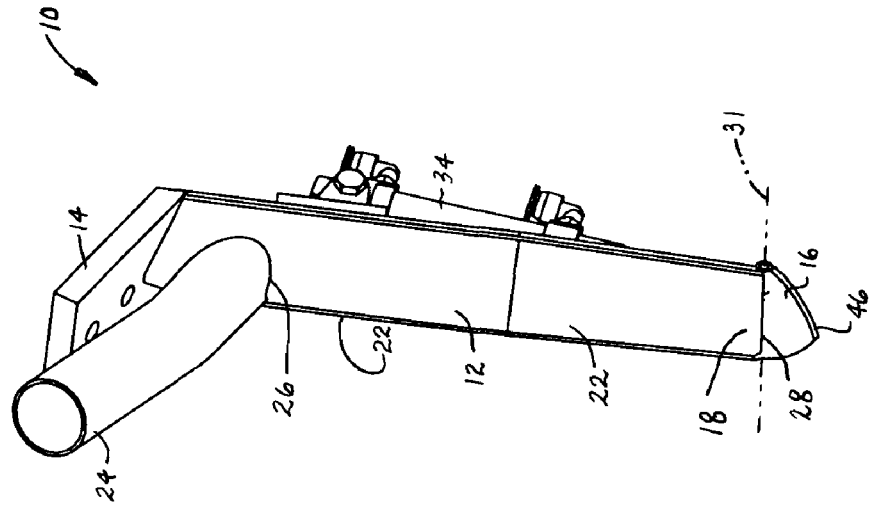
FIGS. 1A and 1B are front and rear isometric views of a fish cleaning apparatus embodying features of the invention.
Figure 1A:
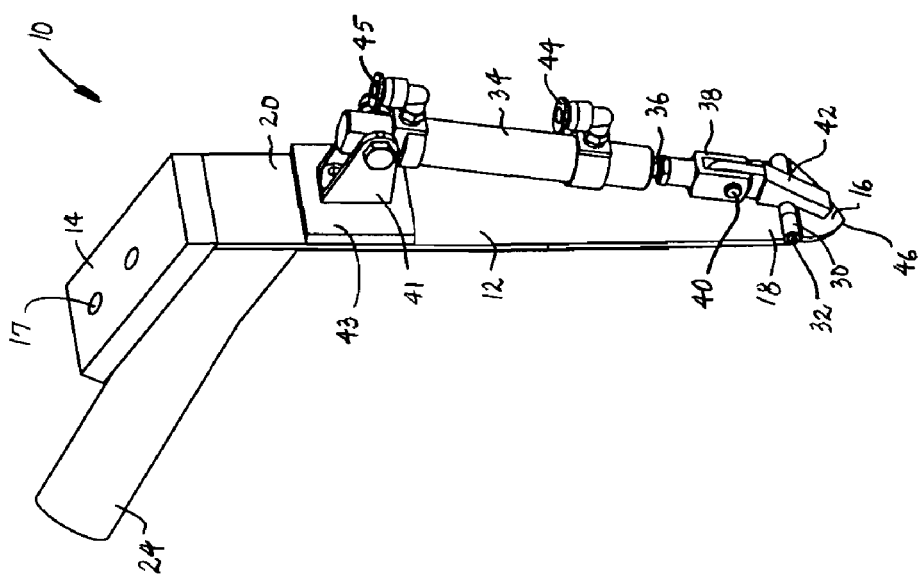

FIGS. 1A and 1B show a cleaning apparatus embodying features of the invention. The cleaning apparatus 10 includes a suction tube 12 attached at one end to a mounting plate 14 and to a scraper 16 at a distal end 18. The cleaning apparatus is fastened to a movable arm 19 (FIG. 2) by bolts or screws through holes 17 in the mounting plate. The suction tube in this example is a hollow tube, generally triangular in cross section, formed by three rectangular sides: a front side 20 and a pair of rear sides 22 extending obliquely from the front side and meeting to complete the periphery to the tube. A vacuum hose 24 communicates with the suction tube through an opening 26 in the tube near the mounting plate. The hose is connected to a conventional vacuum pump (not shown), which causes suction through a triangular mouth 28 formed by the bottom edges of the three sides of the tube at its open distal end. The bottom edge of the front side 20 of the tube is attached to one edge of the scraper 16 by a hinge 30. The scraper can pivot toward or away from the suction tube along an axis 31 defined by a hinge pin 32 confined in the hinge.

An actuator 34, such as a pneumatic actuator, is operatively coupled to the scraper. The actuator encloses a piston 36 terminated at one end in a clevis 38 having a clevis pin 40. The actuator is retained at one end by a bracket 41 mounted to a base plate 43 that is affixed to the front side 20 of the suction tube. A head 42 fastened to the scraper 16 has a narrow neck with a hole that receives the clevis pin. Pneumatic fittings 44, 45 attach to air lines (not shown), which are used to control the extension of the actuator's piston. As the piston moves within the actuator and linearly translates the clevis, the head is forced to rotate relative to the clevis about the axis of the clevis pin. When the clevis is retracted toward the actuator's housing, the hinge opens and the scraper assumes an extended position with its scraping edge 46 angled away from the mouth of the suction tube. Conversely, when the clevis is fully extended away from the actuator's housing, the hinge closes and the scraper assumes a retracted position covering the mouth of the suction tube. The shape of the scraper is such that it completely covers the mouth of the suction tube. In this example, the shape of the scraper is generally triangular, which generally conforms to the inside wall of the belly. The cross section of the suction tube is preferably also triangular to match the shape of the scraper.

Further details of the operation of the cleaning apparatus are shown in conjunction with the details of a cleaning process illustrated in FIGS. 2A–2F. The cleaning apparatus 10 is mounted to the end of an arm 19, which is biased downward 49 by a spring or the like at a pivot 50. The pivot is formed in a bracket 52 suspended from a movable positioning device 54, which can move the cleaning apparatus horizontally along the long axis of a fish 56 to be processed (left/right on the page of FIG. 2), as well as vertically. The positioning device may additionally be able to move laterally across the belly-up fish (in and out of the page of FIG. 2). The motors, gears, controller, and other elements required to automate the motion of the positioning device are conventional and are not shown in order to simplify the description. A holding device 58 is used in concert with the cleaning apparatus to keep the fish stationary during cleaning.

Figure 2A:
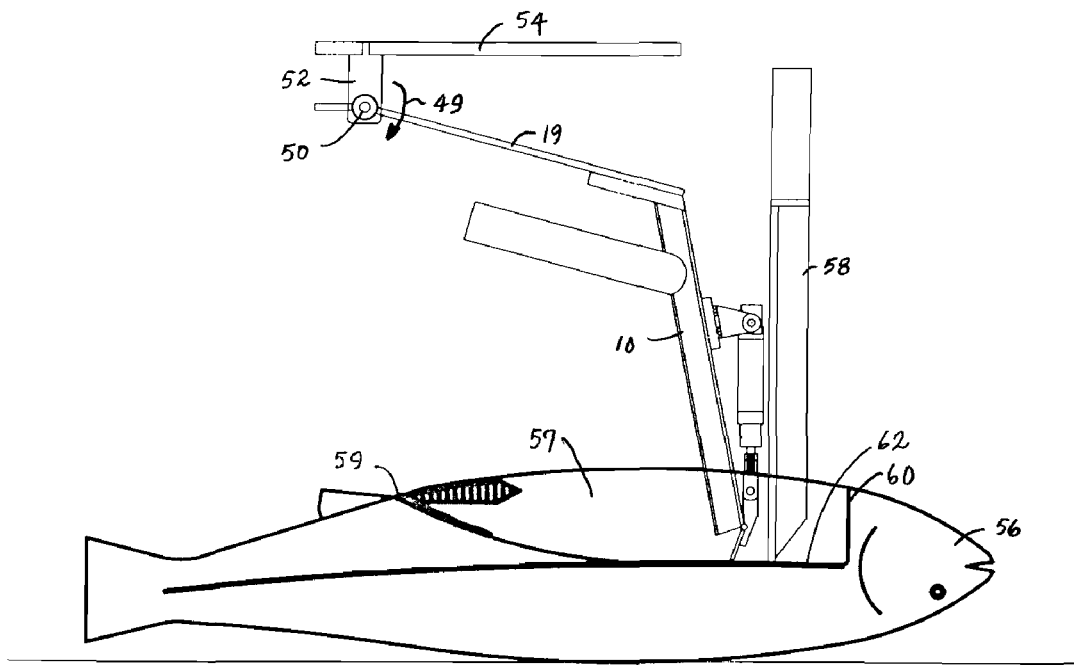
FIGS. 2A–2F are side elevation diagrams illustrating the operation of the apparatus of FIGS. 1A and 1B in a sequence of fish-cleaning steps.
Figure 2B:
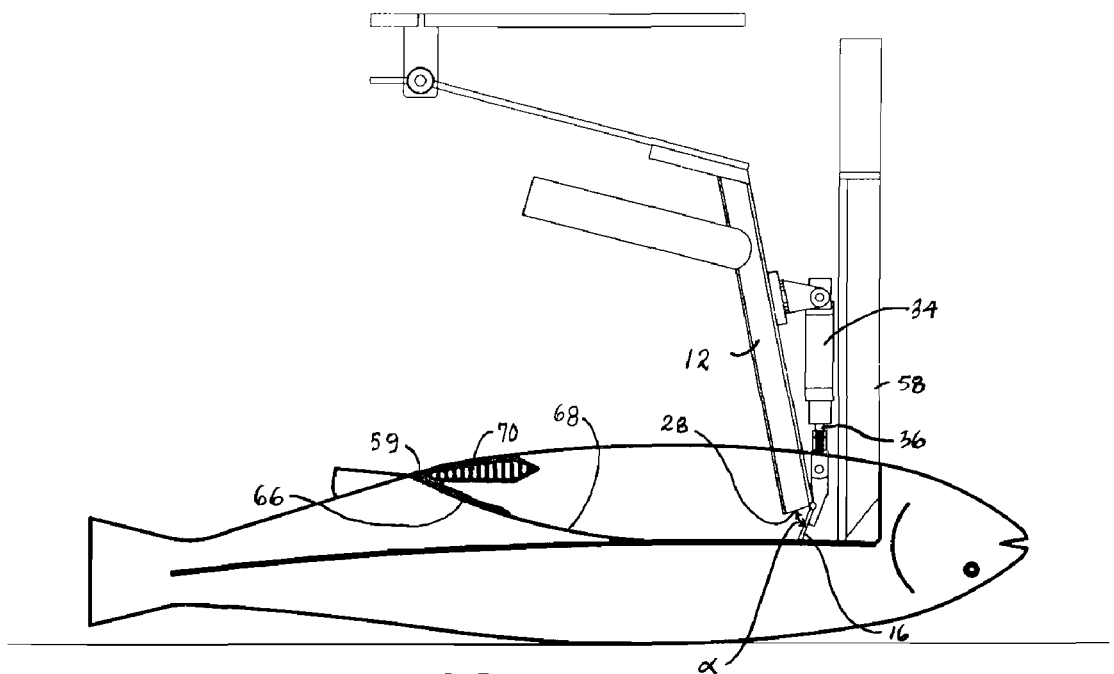

The first step of the cleaning process is illustrated in FIG. 2A. A gutted fish 56, such as a salmon, is moved into position, belly-up, at the cleaning station. The cleaning apparatus and the holding device are lowered into the belly cavity 57 of the fish through a slit cut through the fish's belly seam from the vent 59 forward to the gill plate 60 during gutting. Once the holding device contacts the wall 62 of the belly cavity along the back bone, the holding device is advanced toward the fish's head until it reaches the gill plate. The cleaning apparatus advances forward with the holding device, as shown in FIG. 2B. The holding device is then pushed down against the wall of the fish to keep the fish stationary. The scraper 16 is in an extended position with its scraping edge biased downward against the interior wall of the belly cavity. In this extended position, the scraper is pivoted away from the mouth 28 of the suction tube 12 at an angle α by the retraction of the piston 36 into the actuator housing 34. The scraper is now in position to begin its pass along the wall of the belly cavity.

Figure 2C:
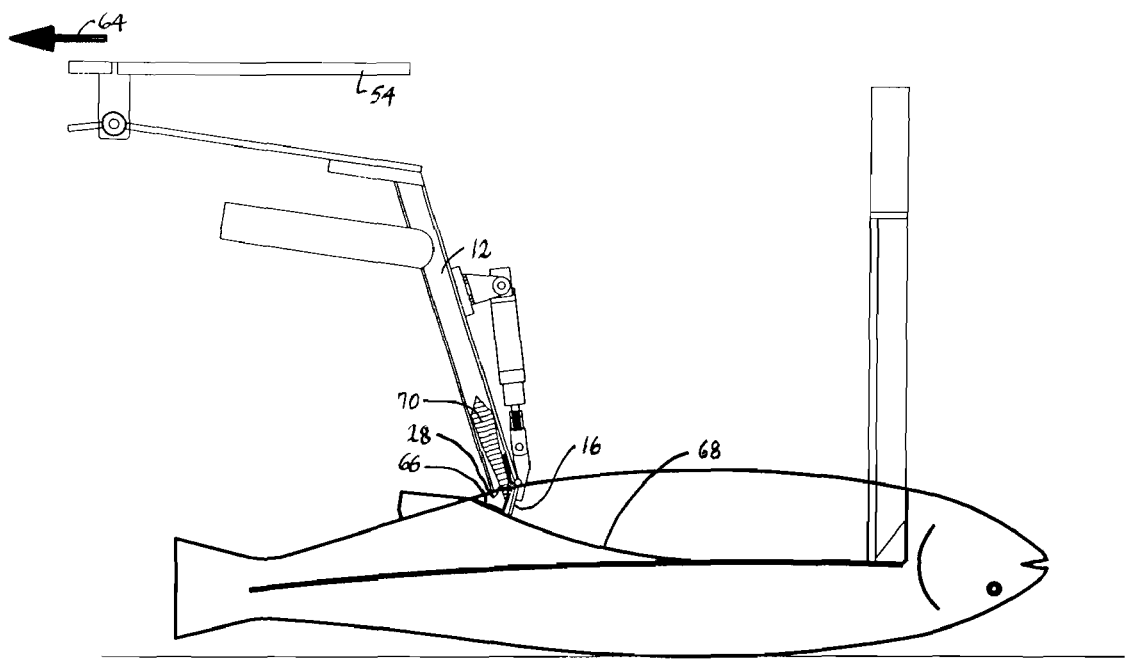

The positioning device 54 advances rearward in the direction of arrow 64 to drag the scraper along the wall of the belly cavity toward the vent, as shown in FIG. 2C. Toward the rear of the belly cavity, the extended scraper 16 encounters residual intestinal matter 66 near the spine 68. The scraper scoops up the intestinal matter, which is sucked through the mouth 28 of the suction tube 12, which travels along just ahead of the scraper. In farm-raised fish, such as salmon, the scraper also scoops up the hard-to-remove residual vaccination wound 70 attached to the belly wall near the vent 59. During the cleaning apparatus's pass through the belly cavity, it also removes other residual visceral matter. (For the purposes of this specification, including the claims and the abstract, the term "visceral matter" means all unwanted matter housed in the bellies of fish, including, without limitation, vaccination wounds, eggs, intestines, kidneys, bladders, hearts, livers, stomachs, and other organs.)

Figure 2D:
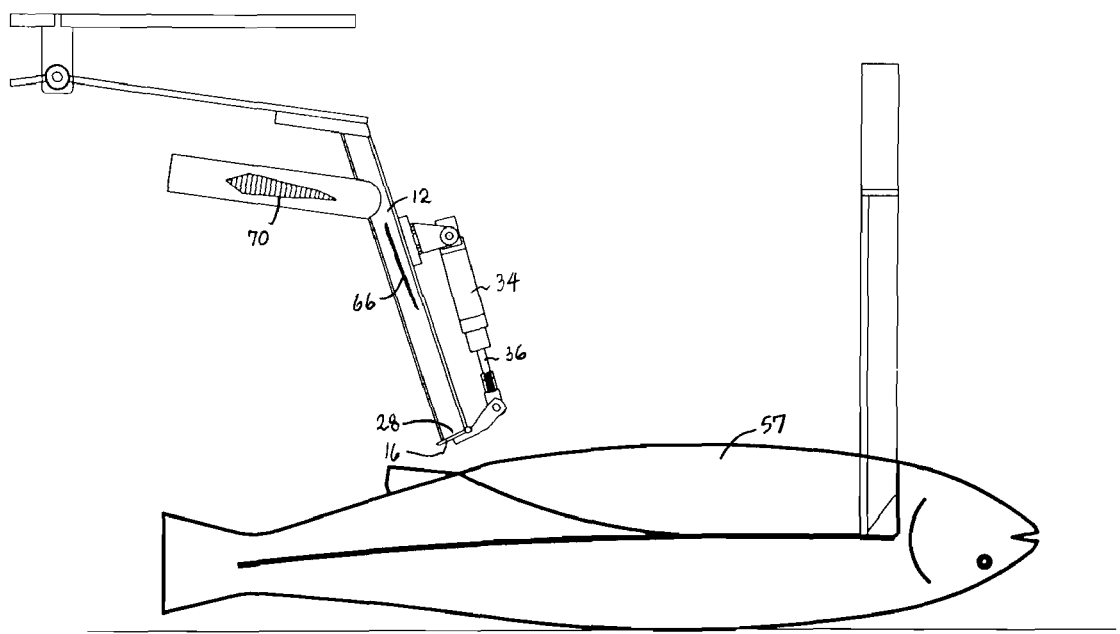
Figure 2E:
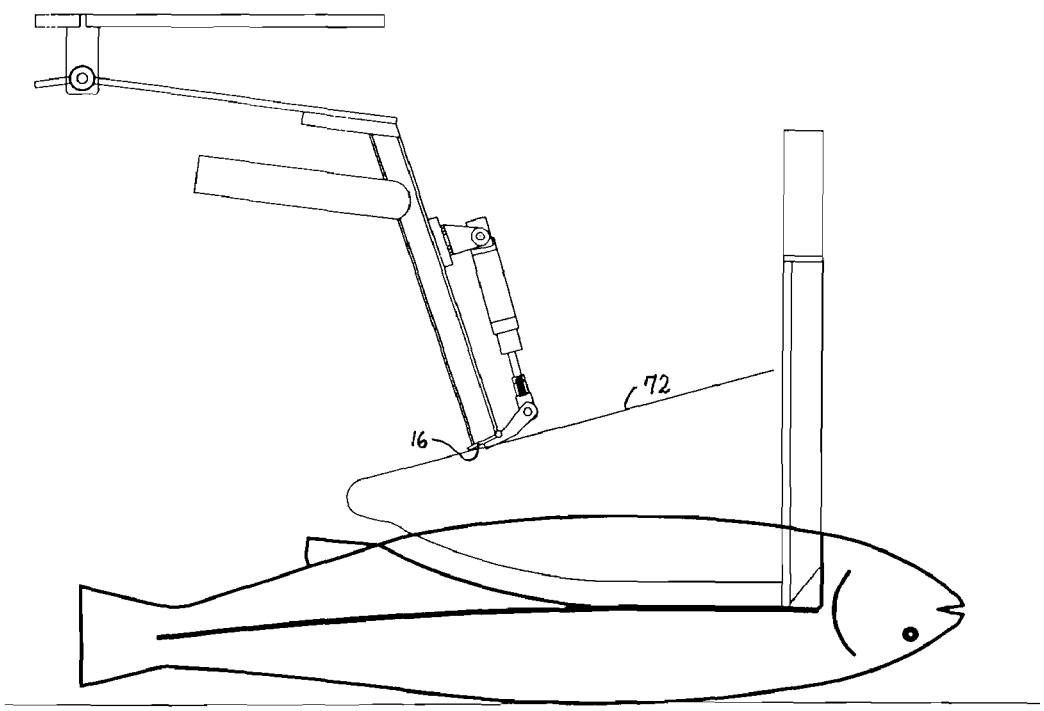
Figure 2F:
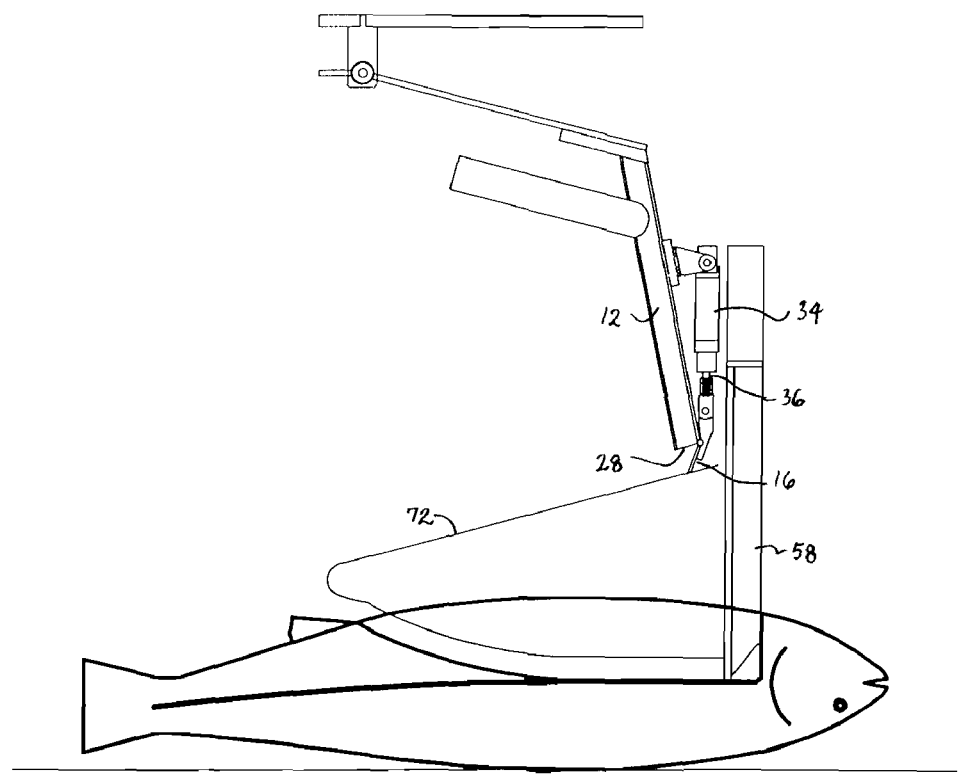

As soon as the cleaning apparatus completes its pass as illustrated in FIG. 2D, the actuator 34 extends its piston 36 to pivot the scraper 16 into a closed position covering the mouth 28 of the suction tube 12. This prevents the visceral matter, such as any residual intestines 66, the vaccination wound 70, and any associated waste, blood, or bits of tissue, from leaking and falling back into the belly cavity 57 from the tube because of the high-speed, jerky motion of the cleaning apparatus as it changes direction or intermittent fluctuations in vacuum strength. As shown in FIG. 2E, the scraper 16 remains closed covering the mouth of the suction tube and giving the vacuum time to suck the tube clean as the cleaning apparatus makes its way back to a start position adjacent to the holding device 58, as shown in FIG. 2F. Once back at the start position, the actuator 34 retracts its piston 36 to extend the scraper to uncover the mouth 28 of the suction tube. The cleaning apparatus may then be lowered to make a second pass through the cavity, or the holding device 58 may be raised to release the cleaned fish. FIGS. 2E and 2F show the path 72 of the scraper through the belly cavity and on its return.

Although the invention has been described in detail with respect to a preferred version, other versions are possible. For example, the pneumatic actuator could be replaced by hydraulic, electrical, or other robotic mechanisms. As another example, the cross section of the suction tube need not be triangular; it could be circular or any other convenient shape. So, as these few examples suggest, the scope of the claims is not meant to be limited to the details of the preferred version.

What is claimed is:

1. Apparatus for cleaning the belly cavity of a gutted fish, the apparatus comprising:
    a suction tube having a mouth at a distal end insertable into the belly cavity of a fish through a slit extending along the length of the belly cavity; and
    a scraper disposed at the distal end of the suction tube and movable from a closed position covering the mouth of the suction tube to an open position uncovering the mouth of the suction tube and extending into contact with the fish inside the belly cavity.

2. The apparatus of claim 1 further comprising a hinged connection between the scraper and the distal end of the suction tube.

3. The apparatus of claim 1 further comprising an actuator operatively coupled to the scraper to pivot the scraper between the open position and the closed position.

4. The apparatus of claim 1 wherein the cross section of the suction tube is generally triangular.

5. The apparatus of claim 1 wherein the scraper and the cross section of the suction tube have the same general shape.

6. Apparatus for cleaning the belly cavity of a gutted fish, the apparatus comprising:
    a vacuum-activated suction tube having a mouth and hinge elements at a distal end insertable into the belly cavity of a fish through a slit extending along the length of the belly cavity;
    a scraper having a scraping edge and an opposite edge hingedly attached to the distal end of the suction tube;
    an actuator that pivots the scraper between a first position of the scraper covering the mouth of the suction tube and a second position of the scraper uncovering the mouth of the tube with the scraping edge angled away from the mouth of the suction tube.

7. The apparatus of claim 6 wherein the actuator is affixed at one end to the suction tube.

8. Apparatus for cleaning the wall of the belly cavity of a gutted fish, the apparatus comprising:
- a scraper having a scraping edge operable in an extended position to move along the length of the belly cavity of a gutted fish with the scraping edge scraping the wall of the belly cavity to dislodge residual visceral matter;
- a suction tube moving with the scraper and having a mouth at a distal end of the suction tube proximate the scraper for evacuating the dislodged residual visceral matter from the belly cavity as the scraper in the extended position moves along the length of the belly cavity and scrapes the wall;
- wherein the scraper is operable in a retracted position to cover the mouth of the suction tube with the scraping edge out of contact with the wall of the belly cavity.

9. The apparatus of claim 8 further comprising a hinged connection between the scraper and the distal end of the suction tube.

10. The apparatus of claim 8 further comprising an actuator operatively coupled to the scraper to pivot the scraper between the extended position and the retracted position.

11. The apparatus of claim 8 wherein the cross section of the suction tube is generally triangular.

12. The apparatus of claim 8 wherein the scraper and the cross section of the suction tube have the same general shape.

13. Method for cleaning the wall of the belly cavity of a gutted fish, the method comprising:
- extending a scraper advancing along the length of the belly cavity of a fish to a first position in contact with the wall of the belly cavity to scrape visceral matter from the wall as the scraper advances along the length of the belly cavity;
- advancing a suction tube having an open mouth just ahead of the scraper as it advances along the length of the belly cavity to evacuate the scraped visceral matter from the belly cavity;
- retracting the scraper into a second position out of contact with the wall of the belly cavity and covering the mouth of the suction tube to prevent visceral matter from leaking from the suction tube into the belly cavity while the scraper and the suction tube are being repositioned to resume scraping.

14. The method of claim 13 further comprising:
repeating the steps of claim 13 in a second cleaning pass.

* * * * *